United States Patent Office 2,990,842
Patented July 4, 1961

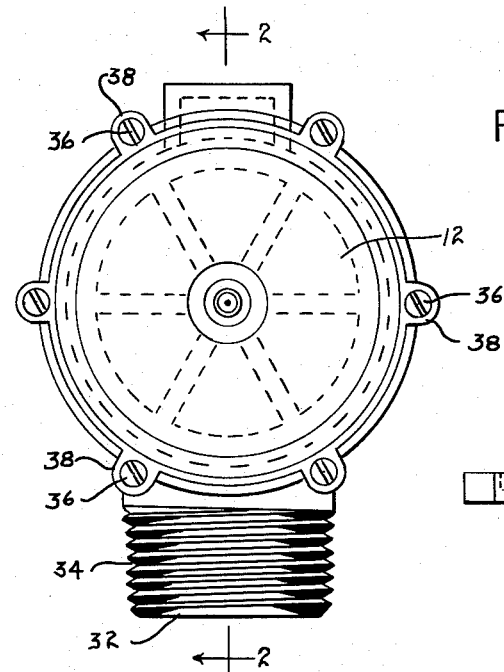
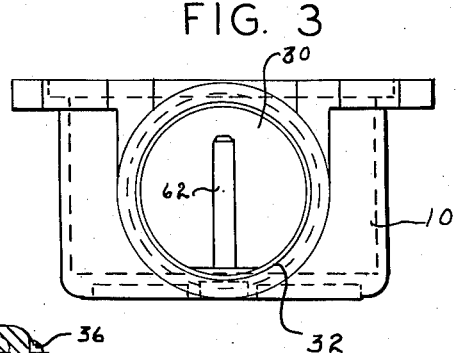
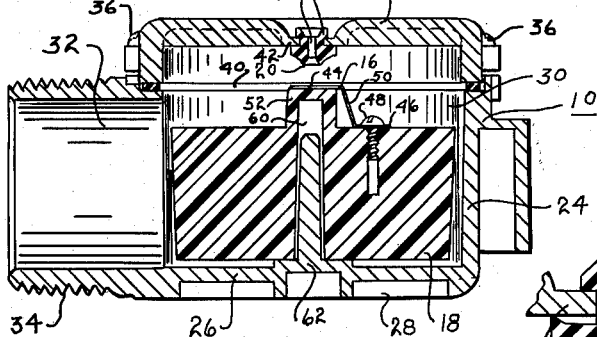
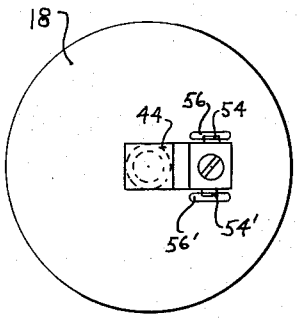
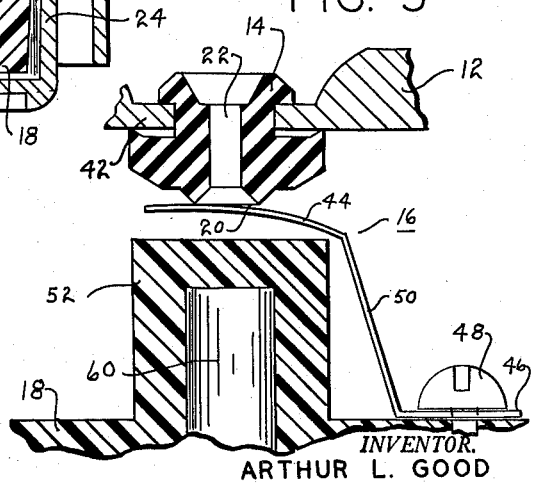
FIG. 1
FIG. 3
FIG. 2
FIG. 5
FIG. 4
INVENTOR.
ARTHUR L. GOOD
BY M. A. Hobbs
ATTORNEY

2,990,842
FLOAT ACTUATED VALVE
Arthur L. Good, Goshen, Ind., assignor, by mesne assignments, to Robertshaw-Fulton Controls Company, Richmond, Va., a corporation of Delaware
Filed Oct. 27, 1958, Ser. No. 769,672
9 Claims. (Cl. 137—202)

The present invention relates to valves and more particularly to a valve for controlling the volume of air in a system.

One of the principal objects of the present invention is to provide a valve for controlling the volume of air in a system containing a liquid and air, which is highly sensitive to slight variations in both increases and decreases in the liquid level in the system.

Another object of the invention is to provide a valve for controlling the egress and ingress of air for accurately maintaining a predetermined liquid level in a system.

Still another object of the invention is to provide a valve having a valve element subjected to internal and external pressures, the operation of which is not appreciably affected by variations in the two pressures or changes in the differential of the two pressures.

A further object is to provide a relatively simple air volume control valve for use in a liquid-air system, such as home water supply tanks, which will operate under adverse conditions and is not readily affected by the presence of foreign matter and which can be easily cleaned and serviced and worn parts replaced without the use of any special tools, equipment, or skill.

Another object of the invention is to provide a valve of the aforesaid type which can be easily fabricated, inspected and assembled and which gives long, trouble free operation with little or no special attention.

Additional objects and advantages of the present invention will become apparent from the following desmription and accompanying drawings, wherein:

FIGURE 1 is a top plan view of my valve shown disconnected from the system;

FIGURE 2 is a vertical cross sectional view of the valve shown in FIGURE 1 taken on line 2—2;

FIGURE 3 is an elevational view of the base of the valve with the cover and operating elements of the valve removed therefrom;

FIGURE 4 is a top plan view of the valve element and the float for controlling the element, removed from the valve; and FIGURE 5 is an enlarged fragmentary view of the valve outlet port, valve element and a portion of the float, showing the valve partially seated on the valve seat of the outlet port.

Referring more specifically to the drawing, numeral 10 designates a valve base, 12 a cover for the base having an outlet port insert 14 in the center thereof, and numeral 16 designates a valve element carried by a float 18 and being adapted to engage a valve seat 20 on the lower port insert 14 surrounding port 22 in said insert. The valve base 10 consists of cylindrical side walls 24 and a substantially flat bottom member 26 integrally joined to the side walls and having a plurality of radially disposed reinforcing ribs 28 on the lower side thereof. Walls 24, bottom member 26 and cover 12 form a substantially enclosed valve chamber 30 which is connected to the system in which the present valve is mounted by a conduit 32 joined integrally with side walls 24 and being threaded on the free end 34 for connection with a conduit or port in the system. Cover 12 is mounted on the upper edge of the base and is secured thereto by a plurality of spaced screws 36 extending downwardly through lugs 38 and threaded into holes in the upper portion of the base. The cover is sealed to the base in fluid tight relationship by a gasket 40.

The valve insert which is preferably neoprene or the like is mounted in a hole in the center of cover 12 and engages a small annular flange 42 defining the central hole on the top, bottom and internal edge to form a fluid tight seal therewith. Since the insert is constructed of flexible or yieldable material it can readily be inserted in the hole in the cover when the valve is initially assembled and thereafter removed and replaced as needed during service. Valve seat 20 consists of an annular surface formed on the lower end of insert 14 around port 22 and is positioned substantially below the lower surface of the cover.

The valve element 16 consists of a flexible metal leaf member having a section 44 for engaging valve seat 20, a section 46 having a hole therein for receiving a mounting screw 48, and an angular section 50 connecting sections 44 and 46. Screw 48 is threaded into a hole in the upper surface of float 18 and preferably is tightened only sufficiently to hold valve element 16 in operative position without gripping the element appreciably. The valve element is operated by float 18 in response to variations in the liquid level in chamber 30 and is seated on valve seat 20 as the liquid level rises to a predetermined point, a firm and positive seat being obtained by an upwardly extending stem 52 in the center of the upper surface of the float. Section 44 of the element rests on the upper end of the stem when the valve is unseated and is firmly engaged thereby when the float is urging the element to its seat. The flexibility of the metal valve element and the play provided between the element and screw 48 permit section 44 of the element and stem 52 to separate when the float initially descends as the liquid level decreases below a predetermined point. Section 46 is provided with a downwardly extending ear 54 and 54' along each side which projects into slots 56 and 56', respectively, to retain the valve element in alignment with stem 52 and valve seat 20. While the surface of section 44 of the valve element may be merely the surface of the metal forming the element, for some installations it may be desirable to provide the upper surface of section 44 with a layer of rubber or other resilient valve material to assist in forming an effective seal when said section seats on valve seat 20. Some plastic material can be substituted for the metal in the valve element.

Element 16 is a thin piece of metal and the three sections thereof are flat, except when the element is being removed from its valve seat 20. As shown in FIGURE 5, the valve element is distorted as the float moves downwardly away from the valve seat since the differential between the pressure in the chamber 30 and the ambient air tends to hold section 44 firmly seated on the valve seat. One of the particular advantages of the present valve is that this differential in pressure has very little effect on the operation of the valve element. This is illustrated in FIGURE 5, wherein the float has moved downwardly and is pulling the element away from its seat. All three sections, particularly section 44, flex, bending section 44 adjacent the right hand portion thereof, as viewed in FIGURE 5, sufficiently to break the seal between the upper surface of section 44 and the valve seat. Once the seal is broken between section 44 and the valve seat 20, the ingress of the small amount of air between the valve seat and the flexed portion of section 44 is sufficient to substantially equalize the pressures on either side of section 44, thus permitting the valve element to drop away from valve seat 20 and return to its normal configuration resting on top of stem 52. In the unseating operation the pulling away of the right hand portion of section 44 by flexing of said section is accomplished with very little force on element 16 and hence is accomplished with only slight movement downwardly when the level of the liquid in chamber 30 reaches the preselected point. Under some conditions of operation only a slight relief of pressure in the system may be required. In that event section 44 will first be pulled slightly away from the valve seat on the right hand side and as soon as the pressure in the system is relieved, section 44 will automatically reseat itself with a slight increase in liquid level.

Float 18 is preferably constructed of polyethylene, although any other suitable material may be used, and is provided with a central hole 60 for receiving a guide post 62 projecting upwardly from the center of the bottom member 26. While post 62 does not fit snugly in hole 60, it is only slightly smaller than the hole and projects upwardly a sufficient distance to give substantial stability to the float as it moves with the valve element to and from valve seat 20. When the float is constructed of polyethylene and similar materials from which the float can be molded, stem 52 is formed integrally with the remainder of the float body. The upper end of stem 52 is preferably flat though it may be slightly rounded with the highest point in the center.

Although only one embodiment of the present invention has been described in detail herein, various modifications and changes can be made in the present valve without departing from the scope of the invention.

I claim:

1. An air volume control valve, comprising walls forming a cylindrical chamber, a bottom connected to the lower end of said walls, a post projecting upwardly from the center of said bottom, an inlet conduit connected to said chamber, a cover secured to the upper end of said walls and having a centrally located hole therein, an insert in said hole having a port therethrough and a valve seat around said port on the chamber side thereof, a float in said chamber having an upwardly extending centrally located stem thereon and an axially positioned hole extending upwardly from the bottom therein for receiving said post, a flexible metal leaf valve element including a substantially flat section adapted to rest on said stem and seat on said valve seat, and a member offset downwardly from said section connected to the upper surface of said float.

2. An air volume control valve, comprising walls forming a cylindrical chamber, a bottom connected to the lower end of said walls, a post projecting upwardly from the center of said bottom, an inlet conduit connected to said chamber, a cover secured to the upper end of said walls having a port therethrough and a valve seat around said port on the chamber side thereof, a float in said chamber having an upwardly extending centrally located stem thereon and an axially positioned hole extending upwardly from the bottom therein, a metal leaf valve element including a substantially flat section adapted to rest on said stem and seat on said valve seat, and a member joined to one edge of said section connecting said section to the upper surface of said float.

3. An air volume control valve, comprising walls forming a cylindrical chamber, a bottom connected to the lower end of said walls, an inlet conduit connected to said chamber, a cover secured to the upper end of said walls and having a centrally located hole therein, an insert in said hole having a port therethrough and a valve seat around said port on the chamber side thereof, a float in said chamber having an upwardly extending centrally located stem thereon, a flexible metal leaf valve element including a substantially flat section adapted to rest on said stem and seat on said valve seat, and a member offset downwardly from said section connected to the upper surface of said float.

4. An air volume control valve, comprising walls forming a chamber, an inlet conduit connected to said chamber, a cover secured to the upper end of said walls having a port therethrough and a valve seat around said port on the chamber side thereof, a float in said chamber having an upwardly extending centrally located stem thereon, a flexible metal leaf valve element including a substantially flat section adapted to rest on said stem and seat on said valve seat, and a member offset downwardly from said section connected to the upper surface of said float.

5. A valve, comprising a body having a chamber therein, an inlet conduit connected to said chamber, a centrally located hole in the top of said body, an insert in said hole having a port therethrough and a valve seat around said port on the chamber side thereof, a float in said chamber having an upwardly extending centrally located stem thereon, a metal leaf valve element including a substantially flat section adapted to rest on said stem and seat on said valve seat and a member offset downwardly from said section connected to the upper surface of said float.

6. A valve, comprising a body having a chamber, an inlet conduit connected to said chamber, a hole in the top of said body, a valve seat around said hole on the chamber side thereof, a float in said chamber having an upwardly extending centrally located stem thereon, a metal leaf valve element including a substantially flat section adapted to rest on said stem and seat on said valve seat, and a member joined to one edge of said section connecting said section to said float.

7. A valve, comprising a body having a chamber therein, an inlet conduit connected to said chamber, a hole in the top of said body, a valve seat around said hole on the chamber side thereof, a float in said chamber, a flexible leaf element having two end portions, one of said end portions adapted to engage said seat upon movement of said float toward said valve seat and the other of said end portions offset from said one end portion and connected to the upper surface of said float.

8. A valve, comprising a body having a chamber therein, an inlet conduit connected to said chamber, a hole in the top of said body, a valve seat around said hole on the chamber side thereof, a float in said chamber, a flexible leaf element having two end portions, one of said end portions adapted to engage said seat upon movement of said float toward said valve seat and the other of said end portions secured to the upper surface of said float.

9. In a valve, an annular valve seat, a flexible leaf element having two end portions, one of said end portions being relatively flat for engaging said seat and the other of said end portions being offset from said one end portion, and means movable toward and away from said seat along a line substantially perpendicular to the surface of said one end portion for engaging said seat, said means being connected to said other end portion for moving said one end portion to and from said seat.

References Cited in the file of this patent

UNITED STATES PATENTS

| 1,940,007 | Moore | Dec. 19, 1933 |
| 2,180,173 | Share | Nov. 14, 1939 |
| 2,784,740 | Stageberg | Mar. 12, 1957 |
| 2,835,468 | Sparks | May 20, 1958 |

FOREIGN PATENTS

| 660,696 | Great Britain | Nov. 14, 1951 |